Aug. 14, 1945.  F. KOVACS  2,382,068
METHOD FOR MANUFACTURING TIRES
Filed May 25, 1942   5 Sheets-Sheet 1

INVENTOR
FRANK KOVACS

BY
Ralph Barrow

Aug. 14, 1945.  F. KOVACS  2,382,068
METHOD FOR MANUFACTURING TIRES
Filed May 25, 1942  5 Sheets-Sheet 2

INVENTOR
FRANK KOVACS
BY Ralph Barrow

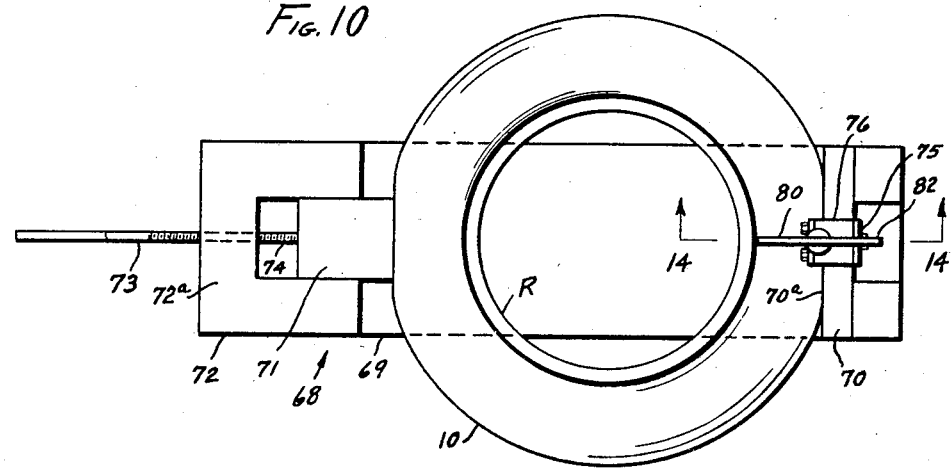
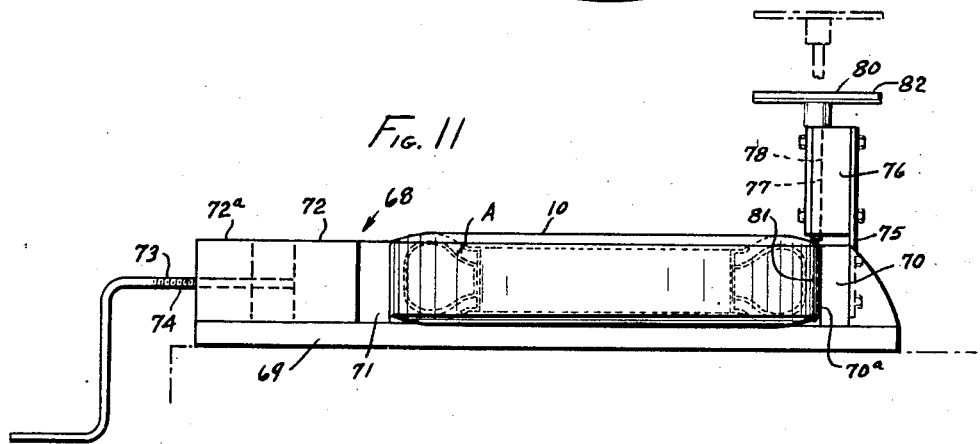
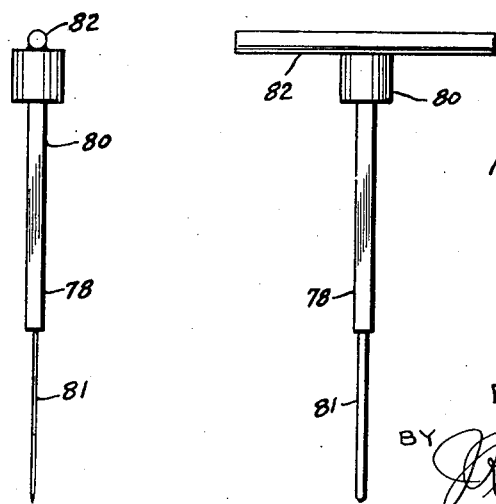
INVENTOR
FRANK KOVACS

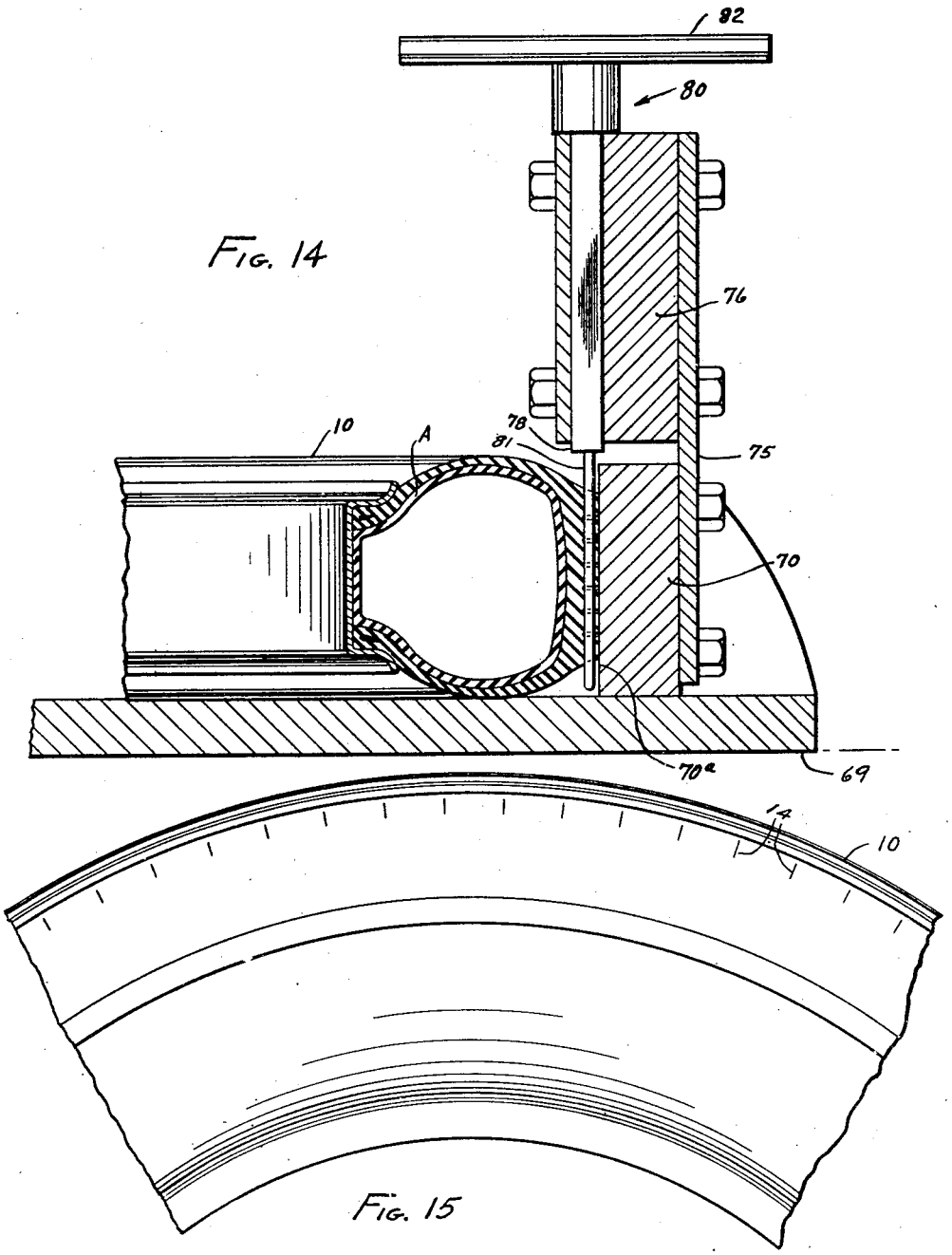

Patented Aug. 14, 1945

2,382,068

UNITED STATES PATENT OFFICE 2,382,068

METHOD FOR MANUFACTURING TIRES

Frank Kovacs, Akron, Ohio, assignor to Seiberling Rubber Company, Barberton, Ohio, a corporation of Delaware Application May 25, 1942, Serial No. 444,439

4 Claims. (Cl. 154—14)

This invention relates to pneumatic tire structures of vulcanized rubber or the like, and in particular relates to methods for producing the same.

Heretofore, new or unworn tires, in general, have had satisfactory characteristics in regard to stopping ability and traction. Differences in these characteristics may be found in various types of new tires, depending on design, but such differences are slight. It is possible to obtain improved anti-skid and traction qualities in such new or unworn tires by various slitting and other tread alterations but, in the past, this has been accomplished usually at the expense of obtaining other undesirable characteristics, such as noise, uneven tread wear, tread cracking, etc.

Most present day low pressure balloon tires have one or more continuous circumferential ribs, which upon wearing down naturally become more stiff or less flexible, and because of this stiffening of the ribs, stopping and traction values of the tire are materially reduced. The more the tread wears down, the more rigid the ribs become, and consequently, the less the stopping and traction value becomes.

In the past, conventional tires have been provided with transverse slits or cuts in the continuous ribs thereof, but these cuts have usually extended from the ground-engaging surfaces of the ribs to the full depth of the grooves defining said ribs. Such constructions, however, have been found to be noisy and to wear irregularly. In other words, there is too much flexibility in the ribs in the early stages of tread wear. This has given rise to a suggestion by a prior patentee to cut slits in the ribs which are only about one-third the depth of the grooves and then to re-slit the tire in this manner after it has become worn to such an extent that the original slits are no longer effective.

A purpose of this invention is to provide an improved tire having one or more continuous ribs, said tire being so constructed as to give the usual desirable characteristics of the new or unworn tire, but providing ribs in such tires with slits or openings therein which do not become effective until the tire is substantially worn and then which provide flexibility in the worn ribs to continue substantially throughout the life of the tire, the desirable characteristics of traction, anti-skid, uniform tread wear, silence, etc. usually present in the new and unworn tire.

Stated in another way, a purpose of the invention is to provide a tire structure of the character described, which does not require renovation as it wears, and in which the continuous ribs thereof have slits or openings arranged therein in such a manner that excessive flexing of the ribs is obviated at all stages of tread wear, whereby the strain on the rubber at the base of the slits, for example, caused by long continued flexing of the ribs, will not tear the rubber inwardly of the slits, through the tread and into the carcass and thereby result in premature failure of the tire.

Another object of the invention is to provide a simple, efficient and practical procedure for producing transverse slits of substantially uniform depth in tire structures of the character described having transversely curved tread surfaces.

These and other objects of the invention will be manifest from the following brief description and the accompanying drawings.

This application contains matter which has been derived from application Serial No. 336,769, filed May 23, 1940.

Figure 1:
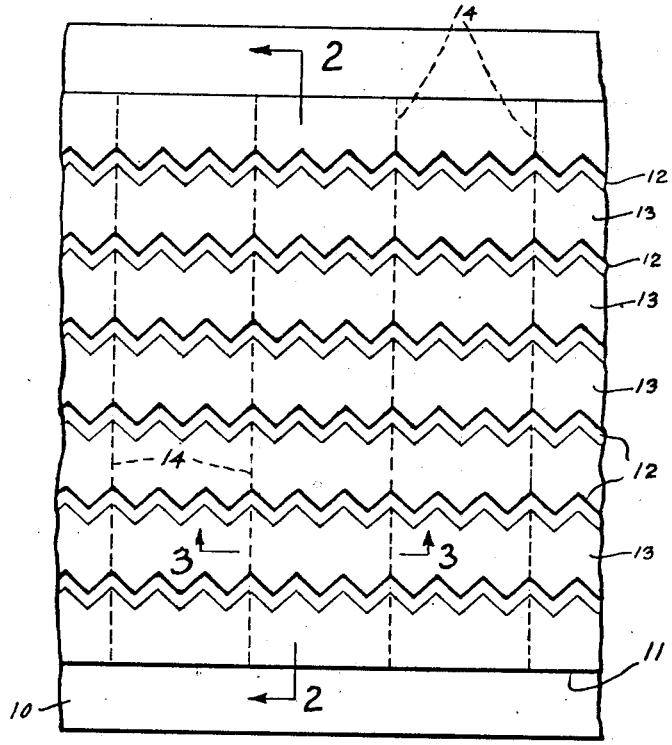
Figure 1 is an edge view of a portion of a pneumatic tire embodying the invention.

Figures 5 to 9, inclusive, are views similar to Figure 1, illustrating various embodiments of the invention in standard tires having a variety of rib formations.

Figure 10 is a plan view of apparatus for manufacturing pneumatic tires in accordance with the invention.

Figure 11 is a front elevation thereof.

Figure 12 is a front detail view of a slitting tool used with the apparatus shown in Figures 10 and 11.

Figure 13 is a side view of the tool shown in Figure 12.

Figure 14 is a cross-section taken substantially on line 14—14 of Figure 10.

Figure 2:
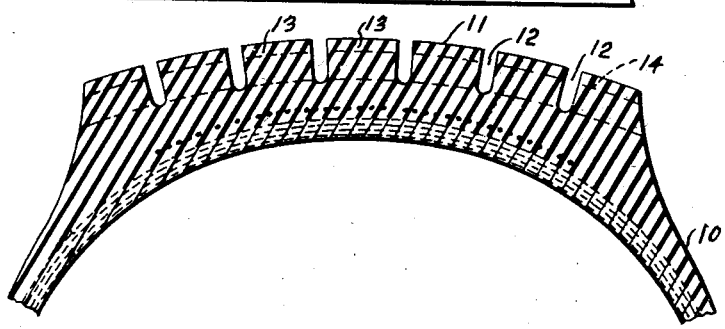
Figure 2 is a transverse cross-section taken on line 2—2 of Figure 1.

Figure 15 is a side elvation of a portion of the tire structure shown in Figures 1 and 2.

Referring to the drawings, a tire embodying the invention is illustrated in Figures 1 to 4, inclusive. The tire shown is of a standard type on the market and comprises the usual carcass construction 10 on which is a tread 11 formed with a series of grooves 12, 12 so formed and spaced as to divide the tread into a plurality of continuous ribs 13, 13 having serrated or saw-tooth non-skid edges. The depth of the grooves 12, or height of the ribs 13, and the width of the ribs determined by the spacing of the grooves, are such that the tread in a new tire will have a high degree of flexibility and wiping action, and the sharp or serrated edges of the ribs will afford ample traction and non-skid qualities. The tread will wear uniformly and will be substantially noiseless in its operation.

But as such a tread wears down, the ribs 13 become less and less flexible, and, in accordance with the present invention, these ribs are slitted as indicated at 14. In the specific embodiment shown, these slits 14, 14 extend completely through all of the ribs of the tread from one side or shoulder of the tread to the other. The slits preferably are of the order of two-thirds of the height of the ribs 13, extending from the bottoms of the grooves outwardly to within one-third the height of the ribs from the outer or wearing surface of the tread. The slits 14 have no effect whatever upon the normal operation of the tire or upon its usual tread characteristics, until the tread has worn down one-third of the height of the ribs, whereupon, the slits 14 become effective and divide the worn ribs into a plurality of separate blocks which provide for sufficient flexibility to maintain substantially the original tread characteristics of the new or unworn tire.

It is to be understood that in tires of different types with different treads, and utilizing different compounds, there may be variation in the height of the slits 14 and that these may extend down into the tread inwardly of the bottoms of the grooves 12, such changes or modifications being contemplated by the present inventor, and being changes in degree within the spirit of the present invention.

The invention may be embodied in many types of tires and in many different arrangements. For example, in Figure 5 there is shown a tire 20 having a somewhat different form of tread provided with a plurality of circumferential ribs 21, 21. In different tires, the slits 22, corresponding to the slits 14 in Figures 1 to 4, are formed in the tread so as to extend through ribs from the opposite sides or shoulders toward the center, and are not caused to pass through the center rib 21, which may be left continuous throughout its height. The breaking up of the side ribs into the separate blocks by means of the slits 22 is ample to maintain substantially the desirable characteristics of the tread throughout the life of the tire, or until the tread has been completely worn away.

Figure 6:
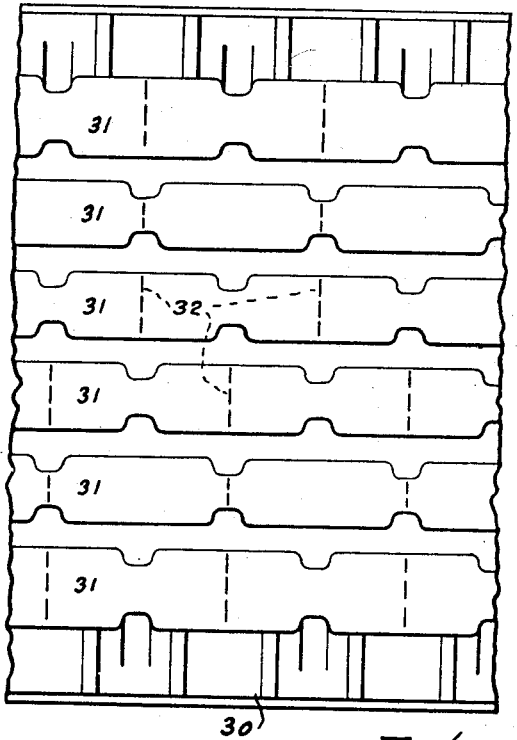

Figure 6 shows another form of the invention in which a tire 30 is formed with continuous ribs 31, 31 in which slits 32, corresponding to slits 14 or 22, are formed through the ribs from opposite sides or shoulders of the tire in staggered relationship. This is a variation which will be immediately understood by skilled artisans since non-skid formations of various types are frequently staggered on opposite sides of the tire.

Figure 7:
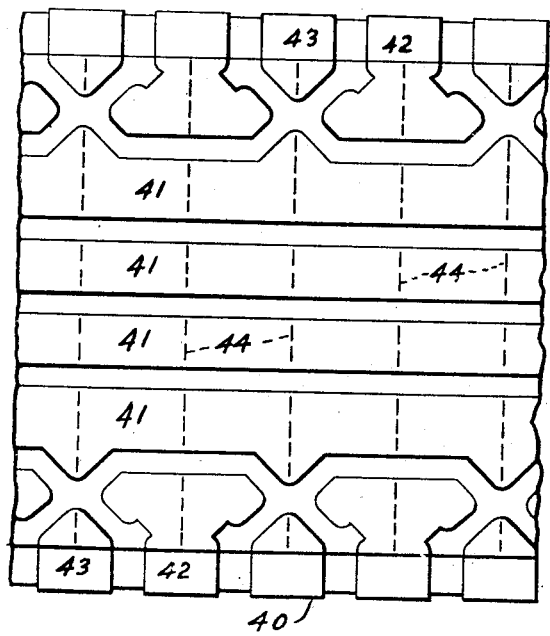

A further form of the invention is shown in Figure 7, in which a tire 40 is shown having a tread comprising central circumferential ribs 41, 41 and the side non-skid blocks 42 and 43 which are circumferentially discontinuous. In this type of tread, the slits 44 may be extended through the ribs from the side or shoulders of the tire in any suitable manner and in doing so may be extended through the side projections 42 as shown. The slits will thus provide the desired action in the ribs 41 and will not substantially affect the normal operation of the side blocks or projections 42 and 43.

Figure 8:
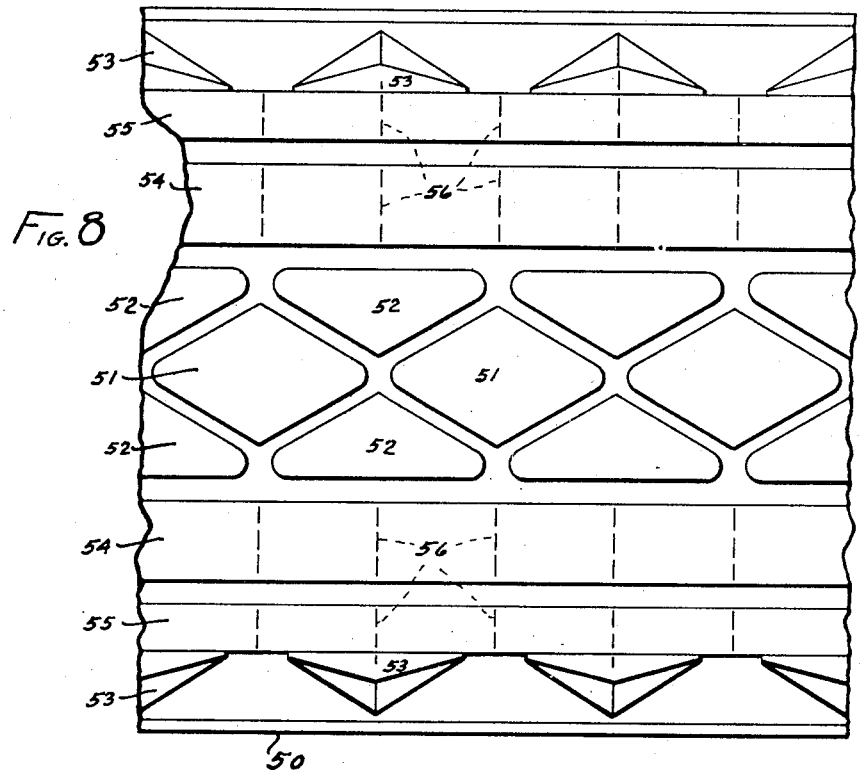

Some types of tires 50, as shown in Figure 8, are formed with central non-skid projections 51, 51, 52, 52, which are circumferentially discontinuous, and with side projections 53, 53 which are also circumferentially discontinuous and there are arranged, substantially in the shoulders of the tread continuous ribs 54, 54 and 55, 55. The ribs 54 and 55 may be slit, as indicated at 56, 56, with slits extending through the ribs and, if necessary, through the side projections 53, as shown.

Figure 9:
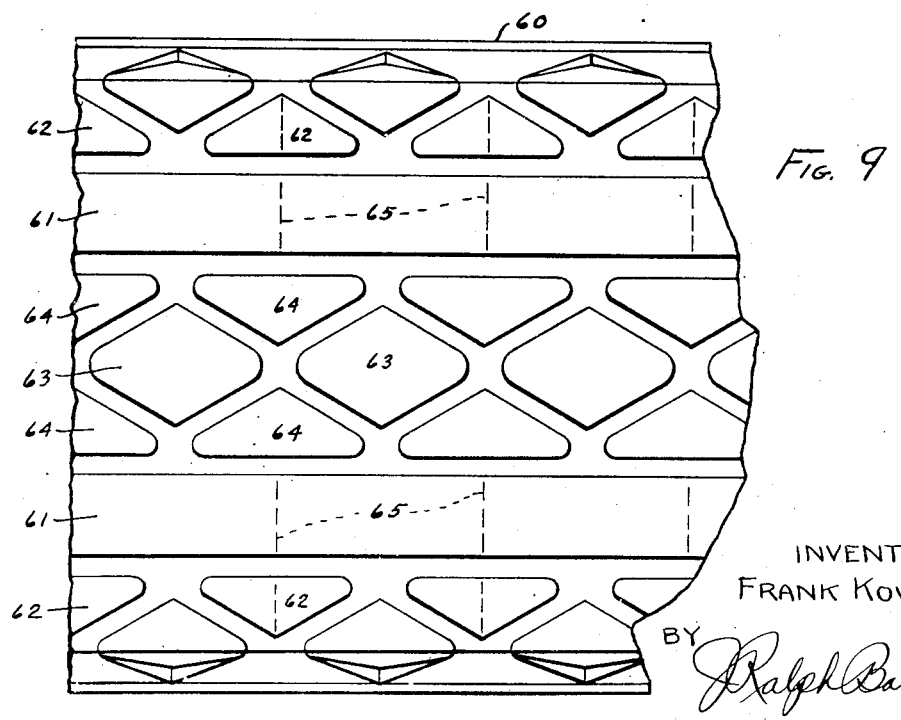

A similar tire is shown in Figure 9 in which there are two shoulder ribs 61, 61, the tire being indicated by the numeral 60 and the ribs 61, having non-skid projections 62, 62 between them and the shoulders of the tire and having non-skid projections 63, 63 and 64, 64 between the ribs at the center of the tire. The tires shown in Figures 8 and 9 are center traction tires, and, in the form shown in Figure 9, the slits indicated at 65, 65 may be extended from the sides of the tires through outer non-skid formations 62 and through the ribs 61.

Figure 3:
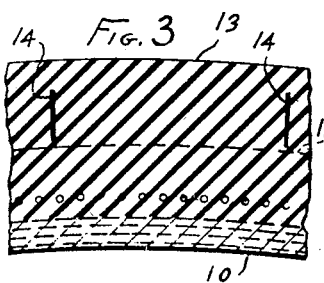
Figure 3 is a cross-section taken on line 3—3 of Figure 1.
Figure 4:
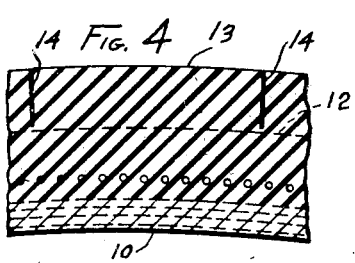
Figure 4 is a view similar to Figure 3, illustrating the tread after it has become substantially worn.
Figure 5:
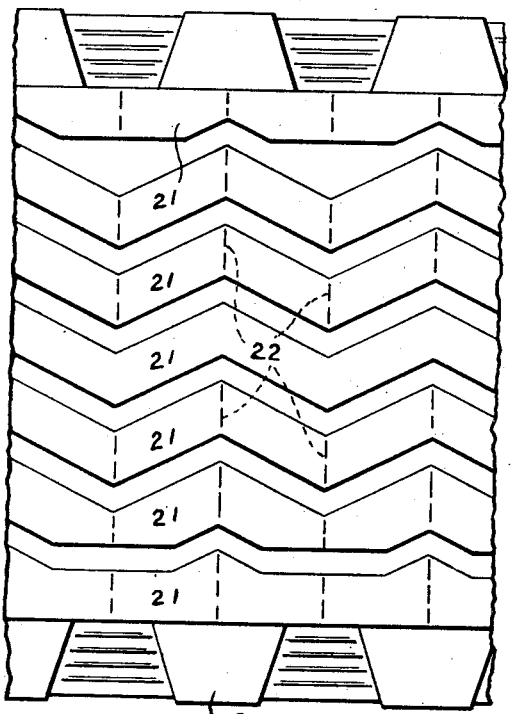

It will be understood that in all forms of the invention as disclosed in the above described paragraphs, and as shown in the figures of the drawings referred to, the ribs are slit substantially in the manner indicated in Figures 2, 3 and 4, so that the slits in all of these tires do not become effective until there has been a substantial wear on the tire, reducing the heights of the ribs whereby they would otherwise be too stiff and inflexible to provide the desired tread characteristics. The ribs of the various types of tires shown may be provided with other outer non-skid slits, slots, nicks or grooves as desired to obtain the desired original tread characteristics but the slits of the present invention should be substantially discontinuous with such outer non-skid slits, slots or grooves.

Tires, in accordance with this invention, may be produced by various procedures either during the vulcanization thereof or subsequently, and by the use of many different types of equipment. The preferred procedure consists in forming the slits in the tread of the tire after vulcanization by flattening the tread and causing one or more knives to pierce the flattened tread from one side to the other thereof or inwardly from opposite sides of the tire toward the center, as may be desired or required.

Suitable procedure and equipment for this purpose are illustrated in Figures 10 to 15, inclusive. This equipment comprises a clamping device 68 having a base portion 69, the latter having a fixed upright 70 at one end, and a block 71 slidably mounted in a U-shaped member 72 fixed on the other end thereof to be shiftable toward and from upright 70. The tire 10, for example, shown in Figures 1 to 4, inclusive, and Figure 11, may be placed between the upright 70 and the shiftable block 71, said tire first being mounted on a rim R and inflated by means of an inner tube A. By means of a crank 73 having a portion 74 threaded through a cross-piece 72ª on member 72, the inner end of the threaded portion 74 is engageable with the slide block 71 for urging the same toward the fixed upright 70. By turning the crank 73, pressure is applied at diametrically opposite points of the tire to flatten out a substantial portion of the normally curved outer tread portion thereof at the point where it is urged against a flat inner surface 70ᵃ of upright 70.

Mounted on a plate 75 secured to the upright 70 may be a block 76 having a vertically extending squared recess 77 slightly inwardly of face 70ᵃ of the upright 70, for receiving a squared stem 78 of a slitting tool 80, said tool having a blade 81 secured to the lower end of stem 78, and having a suitable handle 82. The blade 81 of tool 80 may be relatively flat, and of such proportions, as best shown in Figures 3 and 4, for forming slits of desired size in the tire 10. By means of handle 82, the tool 80 may be urged downwardly in openings 77 to pierce blade 81 transversely through the tread portion 11 of the tire 10, the arrangement being such that the blade forms a transverse slit 14 through the tread in a plane substantially at a 90° angle to the ground-engaging surface of the tire (see Figures 11 and 14), the outer edge of the slit 14 preferably being inwardly of the flat surface 70ᵃ of upright 70, a distance equivalent to about one-third the height of the tire rib, as previously described. A series of circumferentially spaced slits 14 may be formed in the spaced ribs 11 of the tire in this manner (see Figures 1 to 4, and 15), the above described operation being repeated as the tire is progressively shifted and clamped on the device 68. When the tire is released from the device 68, the slits 14 will naturally conform to the transverse curvature of the tire section, as best shown in Figure 2. With slight modifications, the apparatus shown and described may be utilized for forming a plurality of slits in the tire with a single stroke of the slitting tool.

It is to be understood that by means of apparatus substantially as described the slits 14 may be formed to extend at various angles to the ground-engaging surface of the tire. Similarly, the slits may be of varying depths at different points between the tire shoulders, or the outer edges of the slits may be at varying distances from the ground-engaging surface of the tread, to vary the amount of flexibility required at different points in the tread as may be desired in certain tread designs. Also, the slits may be extended through tread portions of the tire at angles to transverse radial planes through the tire.

Thus has been provided an improved tire construction, and a method for manufacturing the same. The continuous outer portions of the ribs give the new or substantially unworn tire the same characteristics as a standard unslit tire. As the tread wears down, however, which stiffens the ribs, the transverse slits or openings of the improved tire become exposed at the ground-engaging surfaces of the ribs, providing additional non-skid edges and worn-rib flexibility to maintain the forementioned desirable characteristics in the tire.

Modifications of the invention may be resorted to without departing from the spirit thereof or the scope of the appended claims. The apparatus disclosed herein is protected in my copending application Serial No. 542,206, filed June 26, 1944.

What is claimed is:

1. A method of manufacturing pneumatic tires having a tread portion including one or more circumferentially extending ground-engaging ribs, said method comprising flattening an area of the tire tread, and piercing said rib or ribs with a tool transversely through the tread portion at said flattened area thereof to provide a slit through said rib or ribs.

2. A method of manufacturing pneumatic tires having a tread portion including one or more circumferentially extending ground-engaging ribs, said method comprising flattening an area of the tread portion of the tire, and piercing said ribs with a tool transversely through the tread portion of the tire at said flattened area to provide at circumferentially spaced intervals a plurality of openings having the outer edges thereof inwardly of the ground-engaging surfaces of said ribs.

3. A method of manufacturing pneumatic tires having a tread portion including a plurality of circumferentially extending ground-engaging ribs, said method comprising flattening an area of the tread portion of the tire, and piercing said ribs with a tool transversely through the tread portion of the tire from opposite sides thereof at said flattened area to provide at circumferentially spaced intervals a plurality of openings having the outer edges thereof inwardly of the ground-engaging surfaces of said ribs.

4. A method for manufacturing tires having a tread portion including one or more circumferential ribs, which comprises progressively flattening areas of the tread portion of the tire around the circumference thereof, and progressively transversely slitting said tread at said flattened areas.

FRANK KOVACS.